United States Patent Office 3,345,330
Patented Oct. 3, 1967

3,345,330
RESINS FROM POLY(HALOMETHYL)DIPHENYL OXIDE AND UREA
Lawrence F. Sonnabend, Midland, Mich., assignor to The Dow Chemical Company, Midland, Mich., a corporation of Delaware
No Drawing. Filed Mar. 20, 1963, Ser. No. 266,527
12 Claims. (Cl. 260—47)

This application is a continuation-in-part of my copending applications Ser. No. 58,907, filed Sept. 28, 1960, now United States Patent 3,216,915; and Ser. No. 58,915, filed Sept. 28, 1960, now abandoned.

The present invention relates to novel thermoset resins characterized by exceptional resistances to chemical and thermal degradation as well as excellent strength properties.

Inasmuch as it is a desideratum in the resin arts to provide new thermoset resins, and soluble, fusible intermediates therefor, which thermoset resins exhibit high resistances to elevated temperatures and chemical attack by aqueous acid or alkaline reagents, it is an object of the present invention to provide superior resins in these regards.

A particular object is to provide novel admixtures and fusible interreaction products of urea and poly(halomethyl)diphenyl oxide compositions. A further object is to provide thermoset resins suitable for employment as the sole constituent of, or as a component in, binders for various molding compositions and coatings for a wide variety of inert substrates, each of these applications being with or without the conjoint use of appropriate catalysts, modifying adjuvants, etc. These and other objects and further benefits will become manifest hereinafter as the invention is more fully described.

In accordance with the present invention, the aforementioned objects are met in newly discovered thermal condensation products of urea and certain poly(halomethyl)diphenyl oxide compositions.

This discovery encompasses the entire range of the various possible, thermally promoted, condensation products of urea with the poly(halomethyl)diphenyl oxide compositions. Such condensates are obtained by contacting these reactants at elevated temperatures. The manner in which the contacting of the reactants is accomplished will, depending upon whether a mass or solution reaction technique is employed, provide correspondingly an infusible, thermoset product or a fusible, thermosettable, intermediate condensate. The latter product can be recovered from the reaction system as a dry solid which can then be thermoset itself by a subsequent thermal treatment.

Further useful variations in the properties of the foregoing resins and resin intermediates are also induced by proper control of the relative proportions of eactants employed, i.e., the molar ratio of urea to available chemical equivalents of halomethyl groups in the poly(halomethyl) diphenyl oxide composition, and the average number of the halomethyl groups per diphenyl oxide nucleus. This average number is termed the halomethyl functionality of the composition.

Poly(halomethyl)diphenyl oxide compositions contemplated herein are the products obtained by halomethylating diphenyl oxide, such products having the general formula:

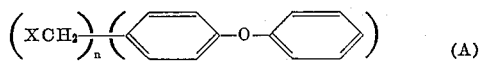

(A)

wherein X is chlorine or bromine and $n$ is a number from about 1.2 up to 4. A specific di(halomethyl)diphenyl oxide compound readily recovered from mixtures of the above halomethylation products, as conventionally obtained by the halomethylation of diphenyl oxide, has the general formula:

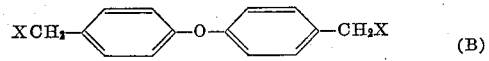

(B)

wherein X is as above defined.

The compositions according to Formula A are further characterized as halomethylation products of diphenyl oxide consisting essentially of a mixture of mono-, di-, tri- and tetrahalomethyl derivatives of diphenyl oxide. These products are further characterized when X is chlorine as having from about 18 to about 36 percent by weight chlorine and when X is bromine as having from about 36 to about 65 percent by weight bromine. The average halomethyl functionality of such mixtures of isomers is $n$ in the above Formula A, i.e., from about 1.2 up to about 3.4. With regard to any individual halomethylated molecule, most of the halomethyl groups will be in positions ortho and para to the oxygen with even distribution of the groups, insofar as possible, between the aromatic rings of the ether. Formula B represents 4,4'-di(halomethyl)diphenyl oxide.

As indicated above, all of the novel condensates contemplated herein are essentially thermally induced reaction products of urea with one or more of the above-described poly(halomethyl)diphenyl oxide compositions of either Formula A or B. The amount of urea which can be effectively condensed with the poly(halomethyl)diphenyl oxide compositions can vary from as little as about 0.25 up to 1 mole of urea for each chemical equivalent of halomethyl substituent groups in the poly(halomethyl)diphenyl oxide composition reacted.

Methods for preparing the poly(halomethyl)diphenyl oxide compositions employed in the invention are known to the art. For example, United States Letters Patent 2,911,380 discloses preparative methods for a wide variety of halomethyl diaromatic ethers. Specific examples of poly(halomethyl)diphenyl oxide compositions, which can be utilized in the admixtures with urea to provide thermoset products or in solution reactions with urea to provide fusible intermediates, include the halomethylation reaction products of diphenyl oxide inclusive of poly(chloromethyl)diphenyl oxide compositions and poly(bromomethyl)diphenyl oxide compositions. The halomethylation products themselves consist predominately of mixtures of isomers and homologs having from 1 to 4 halomethyl groups per diphenyl ether moiety. Thus while compositions employed herein do not comprise solely the mono derivatives, the compositions can contain large proportions of the mono derivative in admixture with higher derivatives so long as the mixture has the specified minimum halomethyl functionality.

The exact composition obtained is dependent upon reaction conditions, and particularly on the proportion of halomethylating agent employed. Also, there may be occasional small amounts of unreacted diphenyl ether present in the product. In any event, the halomethylation products will generally be constituted of such compounds as para-monochloromethyldiphenyl oxide, ortho-monochloromethyldiphenyl oxide, 4,4' - di(chloromethyl)diphenyl oxide, 2,4'-di(chloromethyl)diphenyl oxide, 2,2'-di(chloromethyl)diphenyl oxide, 2,4,4'-tri(chloromethyl) diphenyl oxide, 2,6,4'-tri(chloromethyl)diphenyl oxide, 2,6,2',4' - tetra(chloromethyl)diphenyl oxide, 2,4,2',4'-tetra(chloromethyl)diphenyl oxide and the like as well as the corresponding bromomethyl derivatives of diphenyl oxide.

The aforedescribed poly(halomethyl)diphenyl oxide composition of Formula B is readily obtained from the above-described isomer and analog mixtures. This is accomplished by conventional crystallization separatory techniques. Another separatory technique which can be employed is distillation under reduced pressures.

PREPARATION AND USE OF MASS CONDENSATES

The mass reaction is instituted by heating a physical admixture of urea and the poly(halomethyl)diphenyl oxide composition used at an elevated temperature above the melting point of the mixture. While smaller or larger amounts of urea can be employed successfully to prepare thermoset resins, it is preferred in mass reactions to employ at least about 0.25 up to a maximum of about 0.8 mole of urea per chemical equivalent of halomethyl substituent groups in the poly(halomethyl)diphenyl oxide composition.

The thermosetting reaction can sometimes be accomplished at temperatures as low as 150° F., however, temperatures above about 280° F. are usually required. If desired, thermosetting temperatures up to the decomposition temperature of the thermoset resin, i.e., up to about 750° F., can be employed, but lower temperatures from about 280° F. up to 500° F. are preferred. As the temperature employed is increased, the thermosetting reaction times required are correspondingly reduced. At the higher temperatures mentioned, nearly complete thermosetting reactions can be achieved within a few seconds to several minutes depending upon the heat transfer efficiencies realized and the thickness or shape of resinous mass to be cured.

During the mass condensation, a gaseous by-product is given off and the substantial ceasing of its evolution is a convenient determinant of the reaction end point.

To prepare molded articles with the described thermoset resin, an admixture of urea with one or more of the poly(halomethyl)diphenyl oxide compositions is mixed with a major proportion of an inert filler. Normally the amount of the resinifying components utilized will constitute from about 5 to as much as 40 percent or more by weight of the total composition. The resulting composite of resinifying components and filler is then introduced into a desired shaped mold form with the application of effective molding pressures. Either at this time or later, after further manipulation of the mold as may be desired, the mold contents are heated at a temperature above the thermosetting temperature of the resinifying ingredients of the composite. This may be done while the composite is still within the mold or after removal of the mold form, if the latter operation is permitted by the cohesiveness of the composite. Due to the evolution of a gaseous reaction by-product from the condensation of urea with the poly(halomethyl)diphenyl oxide composition, it is desirable should the heating operation be conducted while the resin-filler composite is still within a mold form to provide suitable escape vents for the gas so as to avoid moldings weakened by excessive and irregular pore characteristics.

Inert fillers that may be bound with the thermoset resin of the invention include siliceous fillers, carbonaceous fillers such as graphite, coke, breeze and powdered coal and the like. Other suitable fillers include fly ash, mica, wheat flour, wood flour, ground walnut shells, and the like fibrous or granular substances that are substantially inert to the resin-providing composition and do not melt, fuse excessively or decompose at the thermosetting and curing temperatures which may be involved in the fabrication of the desired structures.

A particularly efficacious application for the admixtures of urea and the poly(halomethyl)diphenyl oxide compositions involves their utilization as thermosetting coatings or binders for particle, fibrous or fabric substrata such as are used in the manufacture of laminate articles of construction. In such applications, the resinifying ingredients can be applied to the materials to be bound separately or as a preformed admixture. Most desirable for this purpose is a preformed admixture of the resinifying ingredients in the form of a solution or emulsion in water for coating the inert substrata to be bound.

Specifically, the resinifying ingredients of the invention are either solubilized or dispersed in moderately polar, but inert organic solvents such as the lower alcohols and ketones. These materials include, for example, methanol, ethanol, acetone, methyl ethyl ketone and the like. Dimethylformamide and furfural are other effective solvents. Also, with proper utilization of emulsifying agents, the resinifying admixtures can be dissolved and suitably emulsified in an aqueous dispersing medium. Upon formation of a solution or emulsion of the resinifying admixture, the liquid system thus formed is sprayed, poured or otherwise incorporated into or onto a desired substrate. Any excess liquid is permitted to drain off, and preferably, the coated substrate is further air dried at moderate temperatures before being subjected to curing or thermosetting temperatures. After drying, the substrates coated with an admixture of the resinifying ingredients of the invention are cured as by heating in a forced air stream or oven at elevated curing temperatures with or without additional shaping or forming operations. Specific articles which can be prepared in the foregoing manner include particle board from wood chips, laminated hardboard prepared from cellulosic fibers, insulating panels from figer glass and asbestos fibers and the like.

To prepare such articles the amount of the resinifying ingredients applied to the substrate to be bound should be sufficient to insure the desired ultimate thermoset strength. For most applications, a cured thermoset resin binder content from about 1 to as much as 40 percent based on the weight of the inert substrate is sufficient. To obtain this amount of cured resin in the final product, variables apparent to those skilled in the art, such as the concentration of the resinifying ingredients in the dispersing medium, its rate of application and removal, the retention of resinifying ingredients on the substrate to be coated or bound and the like factors will determine the ultimate quantity of thermoset coating or binder in the finished article. Curing of the coated substrates is accomplished as in the manufacture of molded shapes at temperatures from about 280° up to as much as or more than 500° F. Heating at these temperatures can vary anywhere from about one second to as much as 10 or more minutes to obtain a satisfactory cured mass. The thickness of the substrate or composite article to be cured and the efficiency of heat transfer therein, along with the temperature employed, will be largely determinative of the time required to accomplish a complete cure.

The following examples illustrate various thermal mass condensation products of urea with different poly(halomethyl)diphenyl oxide compositions.

Example 1

A thermosettable composition in accordance with the invention was prepared by mixing 25.2 grams of urea powder with 75.8 grams of 4,4'-di(chloromethyl)diphenyl oxide. This mixture was then placed in a dish on a hot plate at 473° F. An infusible resin was formed in about 68 seconds which would char but would not burn when held in the open flame of a Bunsen burner.

Example 2

A solution was prepared from 35 grams of 4,4'-di (chloromethyl)diphenyl oxide and 25 grams of urea in a solvent mixture consisting of about 190 milliliters of methanol and 550 milliliters of acetone. This solution was poured onto a glasswool mat weighing 120 grams. The excess liquid was permitted to drain off and the solids coated mat placed in a stream of air at a temperature of 350° F. for about 10 minutes. The mat thus cured weighed 124.8 grams. Three rigid resin-bound mats prepared in the foregoing manner were placed on a hot plate at a temperature of about 800° F. for about 16 hours.

They did not burn and remained substantially undecomposed retaining most of their original strength.

*Example 3*

An emulsified system of the resin-forming ingredients was prepared by adding 100 grams of a chloromethylated diphenyl oxide composition containing about 37 percent 4,4'-di(chloromethyl)diphenyl oxide, 35 percent 2,4-di(chloromethyl)diphenyl oxide, 21 percent tri(chloromethyl)diphenyl oxide, 0.5 percent tetra(chloromethyl)diphenyl oxide and 5.2 percent mono(chloromethyl)diphenyl oxide to 100 milliliters of water. To this mixture was added 0.125 gram of a surfactant obtained as the reaction product of one mole of oleic acid, 4 moles of butylene oxide and 16 moles of ethylene oxide, 0.125 gram of a surfactant mixture consisting of a non-ionic surfactant and petroleum sulfonate in a hydrocarbon solvent and 40 milliliters of an aqueous 15 percent colloidal solution of silica, Ludox (Du Pont). These surface active materials were employed to promote an effective dispersion of the halomethylated diphenyl oxide composition in the water. The resulting mixture was charged to a blender and thoroughly mixed. A solution of 33.7 grams of urea in 384 grams of water was then added to the blended mixture. The resulting composition was a stable emulsion.

This emulsion of the resinifying ingredients was poured over a mat of glass fibers, the excess liquid being permitted to drain off. The coated mat was then slowly heated over a temperature range from about 350° to about 450° F. until the evolution of an alkaline gas had stopped. The cured resin-bound mat thus prepared was subsequently placed in an open flame where it exhibited high flame resistance. After removal from the flame, the mat appeared to have effectively retained its original physical strength.

In the manner of the foregoing examples, bromomethylated diphenyl oxide compositions containing an average of at least 1.2 halomethyl groups per aromatic molecule and up to about 3.4 halomethyl groups per aromatic molecule, according to Formulas A and B, as hereinbefore described, can be substituted for the polyhalomethylated diphenyl oxide compositions of the foregoing examples with the achievement of comparable results.

PREPARATION AND USE OF FUSIBLE INTERMEDIATE CONDENSATES

When it is desired to prepare fusible and thermosettable intermediate condensation products of urea and the aforedescribed poly(halomethyl)diphenyl oxide compositions according to Formulas A and B, the thermal reaction is conducted in an inert, liquid medium in which the reactants can be dissolved or dispersed. This is essentially a solution reaction and can be carried out effectively employing from as little as 0.25 up to several moles, e.g., 4 or more, of urea per chemical equivalent of halomethyl substituent groups in the poly(halomethyl)diphenyl oxide composition employed as the coreactant.

Like the thermoset products of the physical admixtures, thermoset reaction products of the fusible but thermosetting intermediate adducts prepared by the solution reaction are characterized by superior resistances to elevated temperatures and chemical attack. These intermediate adducts are thermoset by heating them at a temperature above their melting point for a period of time sufficient to achieve a thermoset mass. It is also a characteristic of the adducts that, while being thermoset, they yield an alkaline gas. The completion of the thermosetting reaction is indicated by the ceasing of the evolution of such gas. The fusible adducts are also particularly efficient as modifying adjuvants for resin systems of the prior art such as the thermosetting urea-formaldehyde and modified urea-formaldehyde thermosetting resin systems. The addition of small amounts of the fusible adducts to such resin systems, which may be in either a solid form or an aqueous dispersion, greatly enhances the chemical and thermal resistances of the thermoset products of such modified resins.

Preferred fusible, intermediate adducts, especially for the purpose of fortifying urea-formaldehyde resin systems, are those obtained by contacting an excess of urea with the poly(halomethyl)diphenyl oxide compositions. Particularly, using at least about 1.5 up to as much as 4 or more, but preferably at least about 2 moles of urea for each chemical equivalent of the halomethyl substituent groups in the poly(halomethyl)diphenyl oxide employed as the coreactant provides a novel and highly valuable soluble, intermediate adduct. With the employment of substantial excesses of urea over those amounts required for stoichiometric reaction, the adducts obtained are low in molecular weight and effectively soluble in moderately polar organic solvents. When the 4,4'-di(chloromethyl)diphenyl oxide isomer is used as the sole coreactant for the urea, an essentially pure compound is produced corresponding to the following general formula:

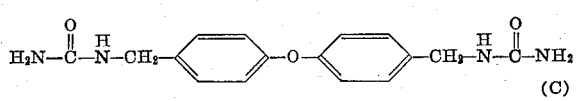

(C)

(4,4'-diureidomethyl diphenyl oxide)

To prepare the soluble, fusible intermediate adducts, inclusive of the 4,4'-diureidomethyl derivatives of diphenyl oxide, halomethylated diphenyl oxide compositions of either Formula A or B and urea are dispersed into a suitable inert liquid reaction medium. The moles of urea used for a given quantity of the halomethylated composition should be at least 0.25 times the halomethyl functionality of the coreactant. When the preferred ureidomethyl derivatives are to be made, the moles of urea used should be at least 1.5 and preferably about 2 times the halomethyl functionality of the coreactant.

A sufficient quantity of the liquid dispersing medium is employed to form a solution or dispersion that is conveniently agitated as by stirring. The entire reaction system is then brought to and maintained at an elevated reaction temperature, while being stirred, for a sufficient period of time to cause at least a portion of the urea and the halomethylated diaromatic ether composition to condense. This solution condensation reaction can be carried out at temperatures ranging from 150° to 250° F. or above and is preferably accomplished at about 200° F. It is usually most convenient, however, to conduct the reaction at the normal reflux temperature of the reaction system. While an effective conversion of the reactants can be obtained within a few minutes, it is desirable for economy of starting material utilization to continue the reaction for several hours in order to achieve a substantial conversion of the reactants to the desired product. This is especially true if batch techniques are employed in the production of the adduct but, as will be readily apparent to those skilled in the art, continuous reaction processes in which unreacted ingredients are continuously recovered and recycled may economically employ comparatively shorter reactant contact times.

It should be noted that the reaction between the urea and the halomethyl groups in the solution reaction is predominately in accordance with a condensation mechanism whereby a hydrogen halide is split out. This by-product may react with any of the nitrogenous compounds present to form a salt thereof, or if the reaction is conducted in the presence of a stronger base, the hydrogen halide split out will react with it. While it is not essential for the preparation of the resins described herein, it is preferred to carry out the condensation reaction under a neutral to slightly alkaline pH.

Any liquid material which is inert to the reactants, capable of dissolving or dispersing one or more of the reactants and being maintained at the temperature for the reaction can be employed as the reaction medium.

Water is a preferred medium. While some of the adducts, particularly, 4,4'-diureidomethyl diphenyl oxide, are soluble in hot water, i.e., about 140° F. or more, all the adducts are essentially insoluble in cold water. Thus, a convenient method for separating the reaction product from an aqueous reaction system involves simply cooling the system down to a temperature at which the product substantially precipitates.

Upon achieving the desired degree of conversion, the intermediate adduct reaction product is separated from the reaction medium by conventional techniques. A convenient procedure when the adduct is formed in an aqueous medium simply involves filtration of the cooled reaction system to remove the desired product followed by washing with cold water to remove any entrained urea. If inert organic solvents such as the lower alkanols are employed as the reaction medium, precipitation of the adduct can be achieved by adding cold water to the system. The adducts thus precipitated can then be filtered, washed and dried. The resulting dried product, depending upon its particular composition, has a melting point range within a temperature range from about 170° F. to about 400° F.

The above-described, intermediate, fusible adducts of urea and the poly(halomethyl)diphenyl oxide compositions can be employed to prepare moldings with or without the presence of an inert filler in a manner similar to that hereinbefore described for the physical admixtures of urea with the poly(halomethyl)diphenyl oxide compositions. Likewise, the intermediate, fusible adducts can be employed as a dispersed phase in a dispersing medium for convenient application to glass fibers and the like substrata for which a strong and chemically resistant, thermoset binder is desired. The following examples contain further illustrations of the thermally promoted, intermediate condensation products of urea and the described poly(halomethyl)diphenyl oxide compositions. It is to be understood that the examples are illustrative of the invention and should not be construed as limitations thereof.

Example 4

A 1-liter flask equipped with a stirrer, thermometer and reflux condenser was charged with 136 grams of 4,4'-di(chloromethyl)diphenyl oxide (approximately 1 gram chemical equivalent of chloromethyl groups), 90 grams of urea (approximately 1.5 gram moles) and 500 grams of water. This reaction system was stirred while being maintained at a temperature within the range from about 185° to 210° F. for 11.5 hours. During this period, a product containing 4,4'-diureidomethyl diphenyl oxide, precipitated in the liquid reaction system. The precipitate was separated from the cooled reaction system by filtration and washed with 1,000 milliliters of cold water. The product was then dried overnight at 104° F. under a high vacuum. After drying, the product weighed 141 grams and appeared as a snow white powder. Elemental analysis of this intermediate product indicated 65.94 percent carbon, 6.26 percent hydrogen, 8.92 percent nitrogen and 1.38 percent chlorine. Infrared analysis showed the presence of alkyl, i.e., alpha-tolyl, substituted urea and —$NH_2$ groups. Upon heating the product began to melt at 354° F. and became completely fluid at 392° F. At about 392° F., it began to polymerize significantly with the evolution of ammonia. The final product was a rigid, thermoset mass which exhibited good strength properties.

Example 5

To a 4-liter flask, equipped in a manner similar to the reaction vessel employed in Example 4, was charged 680 grams of 4,4'-di(chloromethyl)diphenyl oxide (approximately 5 gram chemical equivalents of chloromethyl groups) and 600 grams of urea (approximately 10 gram moles). To this mixture was added 2,500 grams of water. The resulting system was heated at a temperature within the range from about 194° to 203° F. for 11 hours. Subsequently, 615 grams of a solid product were recovered from the reaction system in a manner similar to that employed in the foregoing example. Elemental analysis of this product indicated 69.74 percent carbon, 6.16 percent hydrogen, 0.11 percent chlorine and 10.09 percent nitrogen.

33.3 grams of this product were extracted with water boiling hot in a Soxhlet extractor. The extract was filtered and dried to provide a solid granular product. Elemental analysis of the extracted solids indicated 57.82 percent carbon, 6.43 percent hydrogen, 0 percent chlorine and 15.45 percent nitrogen. This analysis corresponds essentially to a theoretical analysis for 4,4'-diureidomethyl diphenyl oxide of 61.1 percent carbon, 5.72 percent hydrogen, 0 percent chlorine and 17.81 percent nitrogen.

The residue remaining after the foregoing extraction with hot water weighed 30.1 grams. Analysis of this residue indicated 71.62 percent carbon, 6.17 percent hydrogen, 0 percent chlorine and 8.31 percent nitrogen.

Example 6

In a manner similar to that of the foregoing examples, 136 grams of 4,4'-di(chloromethyl)diphenyl oxide and 90 grams of urea were heated over a temperature range from about 194° to 206° F. for 16 hours in 500 grams of water. During this period a precipitate formed in the reaction medium. This precipitate was removed from the reaction system by filtration and washed 5 times with 100 milliliters of distilled water. It was then dried to about 194° F. for 16 hours to a granular, white product.

Subsequently, the dried product was dissolved in and recrystallized from a mixture consisting of 80 parts dimethylformamide and 20 parts water. 50 grams of the recrystallized product, which is hereinafter identified as resin A, were dissolved in 100 cc. of dimethylformamide and the resulting solution was heated overnight at 307° F. to partially polymerize the dissolved adduct. Glass slides were then dipped in this solution and the coated slides heated to 320° F. to thermoset the resin coating. The resin film deposits on the slides were tested by soaking separate individual slides in hot water at 149° F. and a 10 percent by weight sodium hydroxide solution at 77° F. The resulting effects of these solvents on the resin film coatings on the glass slides are reported below in Table 2.

A second intermediate adduct composition was similarly prepared from a dispersion of 340 grams of a poly(chloromethyl)diphenyl oxide composition containing 37 percent 4,4'-di(chloromethyl)diphenyl oxide, 35 percent 2,4-di(chloromethyl)diphenyl oxide, 21 percent tri(chloromethyl)diphenyl oxide, 5.2 percent mono(chloromethyl)diphenyl oxide and 0.5 percent tetra(chloromethyl)diphenyl oxide in 1,250 grams of water containing 225 grams of urea. The resulting reaction system contained approximately 1.4 gram moles of urea for each gram chemical equivalent of chloromethyl groups. This system was heated at a temperature from about 194° to 203° F. for 8 hours. The water layer was decanted and the remaining water-insoluble resin layer was washed twice with 800 milliliters of hot water. Residual moisture was then removed from the organic product by drying it at 320° F. under a vacuum of about 28 inches of mercury to yield 269 grams of a hard, glassy, light yellow resin. Fifty grams of this product, hereinafter identified as resin B, were dissolved in 50 grams of dimethylformamide and the resulting solution was applied to glass slides, thermoset and tested as described above.

Additional adducts were prepared in a manner similar to the foregoing procedure employing molar ratios of urea to chemical equivalents of halomethyl groups at values less than one. In particular, thermal condensates, or adducts, were prepared by reacting urea with 4,4'-di(chloromethyl)diphenyl oxide and with poly(chloromethyl)diphenyl oxide mixed isomer compositions containing about 26 percent by weight chlorine, at molar ratios of urea to chloromethyl equivalents of 0.9 and 0.5. The quantities of reactants and reaction conditions employed are set forth below along with yield, softening point and percent nitrogen determinations. In the table the poly(chloromethyl)diphenyl oxide compositions are referred to under the heading CMDPO.

TABLE 1

| Resin Designation | Reaction Mixture | | | | Product Yield, gms. | Softening Point Range, °F. | Nitrogen, wt. Percent |
|---|---|---|---|---|---|---|---|
| | Urea, gms. | CMDPO, gms. | H₂O, gms. | Molar Ratio Urea/—CH₂Cl | | | |
| C | 50 | ¹ 136 | 500 | 0.9 | 114 | 344–349 | 5.80 |
| D | 54 | ² 140 | 500 | 0.9 | 121 | 192–198 | 5.65 |
| E | 30 | ¹ 136 | 500 | 0.5 | 115 | 370–374 | 5.05 |
| F | 30 | ³ 136 | 500 | 0.5 | 105 | 264–268 | 4.45 |

¹ 136 grams of 4,4'-di(chloromethyl)diphenyl oxide.
² 140 grams of a poly(halomethyl)diphenyl oxide isomer and analog mixture containing 25.3 percent by weight chlorine.
³ 136 grams of a poly(halomethyl)diphenyl oxide isomer and analog mixture containing 26.1 percent by weight chlorine.

Proportions of the above-prepared intermediate adducts were dissolved in dimethylformamide to provide 10 percent solutions of the adduct. These solutions were also employed to coat glass slides on which thermoset films were prepared by heating the coated slides at 347° F. for two hours. These slides were also tested by immersion in water at 139° F. and in 10 percent aqueous caustic at 77° F.

For the purpose of comparison, a conventional thermosettable urea-formaldehyde resin containing 65 percent solids was diluted to 50 percent solids with dimethylformamide. The resulting solution, hereinafter identified as resin G, was also applied to glass slides, thermoset and tested under identical conditions.

To establish a qualitative evaluation of the thermoset films on the glass slides, the visible effects produced by the described testing procedures were given ratings as defined below.

Rating:  Effects observed
I _____ No change. The thermoset remains hard and in place on the glass slide.
II _____ The film surface is slightly softened or there is a visible interaction with the solvent at the film surface.
III _____ The film is substantially softened.
IV _____ The film is substantially separated from the glass slide.

TABLE 2

| | Hot Water 149° F. | | | |
|---|---|---|---|---|
| Glass Slide Immersion Time | 1 Hr. | 22 Hrs. | 48 Hrs. | 68 Hrs. |
| Resin A | I | I | | II |
| Resin B | II | II | | III |
| Resin C | I | II | III | |
| Resin D | I | II | III | |
| Resin E | I | II | II | |
| Resin F | II | III | | |
| Resin G (U–N Control) | IV | | | |

| | 10% Aqueous NaOH 77° F. | | | |
|---|---|---|---|---|
| Glass Slide Immersion Time | 1 Hr. | 22 Hrs. | 48 Hrs. | 68 Hrs. |
| Resin A | I | I | | II |
| Resin B | I | II | | III |
| Resin C | I | I | II | |
| Resin D | I | I | II | |
| Resin E | I | II | | |
| Resin F | III | III | | |
| Resin G (U–F Control) | IV | | | |

What is claimed is:

1. A composition comprising the thermal condensation adduct of urea and a poly(halomethyl)diphenyl oxide composition selected from the group consisting of compositions of the formula:

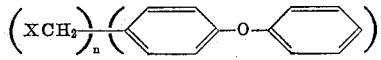

wherein X is selected from the group consisting of chlorine and bromine and n, which is the average halomethyl functionality of the composition has a value of from about 1.2 up to about 3.4 and a composition of the formula:

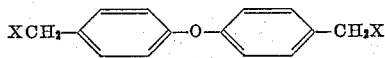

wherein X is as defined above; the moles of urea reacted with the poly(halomethyl)diphenyl oxide composition being within the range between 0.25 and 1 times the halomethyl functionality of the coreactant said thermal condensation adduct being obtained by contacting urea and the poly(halomethyl)diphenyl oxide coreactant at an elevated temperature whereby condensation of these materials is achieved.

2. A composition comprising the reaction product of a physical admixture of urea and a poly(halomethyl)diphenyl oxide composition selected from the group consisting of compositions of the formula:

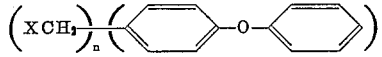

wherein X is selected from the group consisting of chlorine and bromine and n, which is the average halomethyl functionality of the composition, has a value from about 1.2 up to about 3.4, and a composition of the formula:

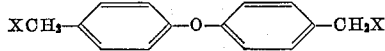

wherein X is as defined above; the moles of urea present in the admixture being in an amount of from about 0.25 to about 0.8 times the halomethyl functionality of the coreactant, said reaction product being obtained by heating the admixture of urea and poly(halomethyl)diphenyl oxide at a temperature which is at least sufficient to melt the composition but below about 750° F. for a period of time sufficient to achieve a thermoset mass.

3. An article of construction comprised of a fibrous mat having uniformly incorporated therein the composition of claim 2.

4. The composition of claim 2 and, in addition, including a major proportion of an inert filler.

5. A method comprising the steps of mixing urea and a poly(halomethyl)diphenyl oxide composition selected from the group consisting of compositions of the formula:

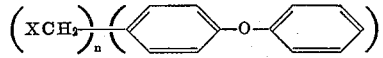

wherein X is selected from the group consisting of chlorine and bromine and n, which is the average halomethyl functionality of the composition, has a value from about 1.2 up to about 3.4 and a composition of the formula:

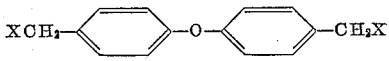

wherein X is as defined above; and heating the admixture at an elevated temperature above its melting point for a period of time sufficient to provide a thermoset mass; the moles of urea employed being in an amount from about 0.25 to 1 times the halomethyl functionality of the coreactant.

6. A fusible composition of matter comprising the reaction product obtained by mixing together, in an inert, liquid medium, urea and a poly(halomethyl)diphenyl oxide composition selected from the group consisting of compositions of the formula:

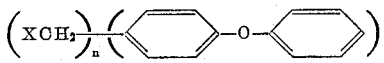

wherein X is selected from the group consisting of chlorine and bromine and n, which is the average halomethyl functionality of the composition, has a value from about 1.2 up to about 3.4 and a composition of the formula:

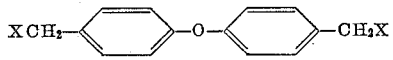

wherein X is as defined above; the moles of urea employed being at least 0.25 times the halomethyl functionality of the coreactant; heating the resulting mixture at an elevated temperature of at least about 150° F. and separating the resulting reaction product from the reaction system whereby a fusible condensate is obtained.

7. 4,4'-diureidomethyl diphenyl oxide.

8. A thermoset composition of matter comprising the product obtained by heating the composition of claim 6 at an elevated temperature above its melting point for a period of time sufficient to provide a thermoset mass.

9. A thermoset mass which comprises the product obtained by heating a physical admixture of the composition of claim 7 with a major proportion of an inert filler at an elevated temperature above the melting point of the composition of claim 6 for a period of time sufficient to provide a thermoset mass.

10. A method comprising the steps of mixing together, in an inert, liquid medium, urea and a poly(halomethyl) diphenyl oxide composition selected from the group consisting of compositions of the formula:

wherein X is selected from the group consisting of chlorine and bromine and n, which is the average halomethyl functionality of the composition, has a value from about 1.2 up to about 3.4, and a composition of the formula:

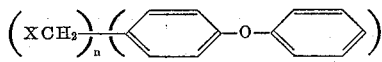

wherein X is as defined above; the moles of urea employed being at least 0.25 times the average halomethyl functionality of the coreactant; and heating the resulting mixture at an elevated temperature of at least 150° F. whereby a fusible condensate is produced.

11. A method as in claim 7 comprising the addition sequential step of separating the fusible condensate from the reaction mixture.

12. A method as in claim 7 wherein the number of moles of urea employed is within the range from about 1.5 to about 4 times the halomethyl functionality of the coreactant.

No references cited.

HENRY R. JILES, *Primary Examiner.*